US 6,602,360 B2

(12) United States Patent
Takemura et al.

(10) Patent No.: US 6,602,360 B2
(45) Date of Patent: Aug. 5, 2003

(54) ROLLING BEARING

(75) Inventors: Hiromichi Takemura, Kanagawa (JP);
Akihiro Kiuchi, Kanagawa (JP); Yasuo Murakami, Kanagawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/777,678

(22) Filed: Feb. 7, 2001

(65) Prior Publication Data

US 2001/0017174 A1 Aug. 30, 2001

(30) Foreign Application Priority Data

Feb. 10, 2000 (JP) ...................... P2000-033923

(51) Int. Cl.⁷ .................. C22C 38/40; C22C 38/48; C22C 38/50; F16C 33/32
(52) U.S. Cl. ............... 148/333; 148/325; 148/328; 148/906; 384/912
(58) Field of Search ................. 148/506, 507, 148/333, 336, 906, 32 S, 328; 384/625, 912

(56) References Cited

U.S. PATENT DOCUMENTS

| 4,287,007 | A |   | 9/1981 | Vander Voort | ............... 148/36 |
| 5,084,116 | A | * | 1/1992 | Mitamura | .................. 148/218 |
| 5,403,545 | A |   | 4/1995 | Takata et al. | ............... 420/112 |
| 5,725,688 | A | * | 3/1998 | Sugi et al. | .................. 148/318 |
| 5,873,956 | A | * | 2/1999 | Tanaka et al. | ............. 148/318 |
| 6,248,186 | B1 | * | 6/2001 | Yamamura et al. | ......... 148/218 |
| 6,367,981 | B1 | * | 4/2002 | Yamamoto et al. | ......... 384/527 |

FOREIGN PATENT DOCUMENTS

| JP | 2-285050 | | 11/1990 | ............ C22C/38/00 |
| JP | 3-173747 | | 7/1991 | ............ C22C/38/00 |
| JP | 4-28845 | | 1/1992 | ............ C22C/38/00 |
| JP | 4-059942 | | 2/1992 | ............ C22C/38/00 |
| JP | 4-143253 | | 5/1992 | ............ C22C/38/00 |
| JP | 5-26244 | | 2/1993 | ............ F16C/33/62 |
| JP | 06293939 | A | * 10/1994 | ............ C22C/38/00 |
| JP | 7-238348 | | 9/1995 | ............ C22C/38/00 |
| JP | 9-89724 | | 4/1997 | ............ G01M/13/04 |
| JP | 11-269603 | | 10/1999 | ............ C22C/38/00 |
| JP | 2000017392 | A | * 1/2000 | ............ C22C/38/00 |

OTHER PUBLICATIONS

"Rolling Bearing Fundamentals", from http://www.maintenanceresources.com/ReferenceLibrary/Bearings/rbf.html, 2000. 3 pages.*

(List continued on next page.)

Primary Examiner—Deborah Yee
(74) Attorney, Agent, or Firm—Sughrue Mion, PLLC

(57) ABSTRACT

An outer ring 2 as a stationary ring is fabricated with an iron-steel material of the following composition. Alloying components contain carbon (C) 0.40 wt % to 1.20 wt %, silicon (Si) and/or aluminum (Al) 0.7 wt % to 2.0 wt %, manganese (Mn) 0.2 wt % to 2.0 wt %, nickel (Ni) 0.1 wt % to 3.0 wt % and chromium (Cr) 3.0 wt % to 9.0 wt %. Cr-equivalent amount shown in the following (1) formula is 9.0 wt % to 17.0 wt %. In the bearing face, the hardness is HRC57 or higher, fine carbides (diameter 50 to 500 nm) are dispersively precipitated, and the maximum diameter of carbide is less than 10 μm.

Cr-equivalent amount (%)=[Cr]+2[Si]+1.5[Mo]+5[V]+5.5[Al]+1.75[Nb]+1.5[Ti]    (1).

12 Claims, 1 Drawing Sheet

OTHER PUBLICATIONS

Sae Technical Paper Series; Yasuo Murakami, et al.; Long Life Bearings for Automotive Alternator Applications; International Congress and Exposition Detroit, Michigan; Feb. 27–Mar. 2, 1995; p. 1–14.

Wear, 24; J.A. Ciruna et al.; The Effect of Hydrogen on the Rolling Contact Fatigue Life of Aisi 52100 and 440C Steel Balls; 1973; pp. 107–118 No month.

Wear, 199; K. Tamada, et al.; Occurrence of Brittle Flaking on Bearings Used for Automotive Electrical Instruments and Auxiliary Devices; 1996; pp. 245–252 No month.

Tribology Conference in Japan Society of Tribologiests in May 1995–5; Toshikazu Nanbu, et al.; Measurement of slippage of ball own–axis rotation of ball bearing receiving radial load, and relationship with brittle peeling.

Measurement of resistance values of mixed mode crack growth and explication of mechanism thereof; published in Mar., 1997, No Author.

* cited by examiner

ROLLING BEARING

BACKGROUND OF THE INVENTION

1. Field of the Invention

The invention relates to a rolling bearing, in particular a rolling bearing suitable for engine auxiliary machines (alternator, electromagnetic clutch, compressor, intermediate pulley or water pulley) to be used at high temperatures, high vibrations and under circumstances where lubricate film formation is difficult owing to or a water invasion.

2. Description of the Related Art

Recently, in company with making automobiles small sized and light weight, auxiliary machines of engines have also been demanded to provide high performance and high output together with making the small size and the light weight. For example, bearings for alternators are acted on through belts with high vibration or high load (around 4 G to 20 G at the acceleration of gravity) accompanying rotation of high speed simultaneously with working of the engine. Therefore in the conventional bearing for the alternator, a problem has been present that exfoliation is easy to occur at an earlier period of service especially in the bearing face of the outer ring being a stationary ring.

It is considered that the exfoliation at an early period of the service is generated because the bearing face of the outer ring and the rolling faces of the rolling elements easily contact in that the formation of an oil film is difficult in company with increase of stress by high vibration, and a water content of around 0.1% in a grease or a water invasion during car washing, dissolve the grease.

Of shortening life of the bearing in case of the water invasion into the bearing, described in "Wear, 24 (1973) 107–118, The Effect of Hydrogen on the Rolling Contact Fatigue Life of AISI 52100 and 440C Steel Ball" by J. A. Cirura and other.

This literature sets forth, as results of four ball rolling tests, that the life in the test where a water was mixed in the lubricant was reduced to around 1/10 of the life in other tests where the water was not mixed therein, and further as results of rolling fatigue tests using steel balls of hydrogen charge as rolling elements, that the life in the test where stainless steel (SUS440C) balls were used was longer than the life in the test where steel balls made of high carbon chromium bearing 2 category (SUJ2).

There have been proposed many techniques for preventing the early exfoliation so as to lengthen the life of the bearing to be served under the high vibration and high load.

For example, Japanese Patent Unexamined Publication No. Hei. 3-173747 proposes, in a grease sealed bearing, that at least the bearing ring at the stationary ring-side is made of martensite based stainless steel. It is described to employ, as the martensite based stainless steel, 13% Cr-0.3% C steel having a tempered martensite fabrication (e.g., SUS420J2), otherwise 13% Cr- or 18% Cr-high carbon stainless steel (e.g., SUS440A being 13% Cr-0.7% C steel and SUS440C being 18% Cr-1% C steel).

Japanese Patent Unexamined Publication No. Hei. 4-28845 proposes the use of a steel containing lower carbon (C) and higher chromium (Cr) (C: 0.65 to 0.90 wt %, Cr: 2.0 to 5.0 wt %, Si: 0.15 to 0.50 wt % and Mn: 0.15 to 1.0 wt %) in comparison with SUJ2 which has hitherto been used. It is described to use steel materials where the above steel is, as needed, added with at least one kind of Ni (0.2 to 0.5 wt %), Mo (0.1 to 2.0 wt %) and V (0.05 to 1.0 wt %).

According to this description, the early exfoliation is caused by generation of a white structure in steel which occurs by cohesion of carbon. Thus, by employing steels of low carbon, the carbon is prevented from diffusion to be a cause of cohesion for attaining the long life.

Japanese Patent Unexamined Publication No. Hei. 5-26244 describes that the early exfoliation is caused by invasion of hydrogen into steel generated in company with decomposition of grease and hydrogen embrittlement caused thereby. It is therefore proposed therein to employ a steel containing Cr 1.5 to 6% for at least the bearing ring at the stationary ring-side. There is described that an oxide film of Cr is formed on the surface of the bearing ring so that a rolling surface (orbital surface) is made inactive, and so the grease is prevented from decomposition, or even if it is decomposed, the hydrogen generated thereby is avoided from invasion into the steel (bearing ring).

Further, as a measure for preventing the early exfoliation of the stationary ring, a fatigue mechanism of the bearing for alternators is explicated at the 1st article to the 14th article of "SAE Technical Paper: SAE 950944 (open Feb. 27 to Mar. 2, 1995), and it discloses to change the sealed greased from E grease to M grease. The M grease has a high damper effect, and if using to the bearing to be served under high vibration and high load, it fully absorbs vibration and load, and it is possible to prevent the early exfoliation of the stationary ring.

However, some of the prior techniques cannot actually provide the disclosed effects, and even if providing, there remains a room for improving several respects of workability of a steel to be served, hardness for the bearing members, corrosion resistance, and cost.

For example, as described in pp. 551 to 554 of "Preparatory Manuscript for Japan Tribology Congress (Tokyo, May 1995)", the bearing for auxiliary machine of engine to be used under the high vibration and high load creates self-rotating slide at an entrance side of the stationary ring. Cr oxidized film to be formed with a steel of 1.5 to 6% Cr is easily broken by the self-rotating slide, and so it will be difficult to prevent the early exfoliation of the stationary ring by the method disclosed in Japanese Patent Unexamined Publication No. Hei. 5-26244.

Further, in "WEAR 199 (1996) p 245 to 252, Occurrence of brittle flaking on bearing used for automotive electrical instruments and auxiliary device" by Tamada and others, it is described that in the rolling fatigue test of line-contact by test pieces of hydrogen charge, test pieces of stainless steel of 13% Cr make change of white structure and breakage similar to test pieces of SUJ2 or SUJ3.

Also even in a case of the M grease, the formation of the oil film might be often insufficient in an atmosphere at high temperature exceeding 150° C. In addition, if difference in atmospheric temperature is large, a dew easily occurs within the bearing, and a water by the dew might go into the lubricant.

SUMMARY OF THE INVENTION

The invention has been made in view of these problems involved with the conventional technique, and with respect to the rolling bearings to be used at high vibration, high load and under the using conditions where the water might mix into the lubricant, the invention is accordingly to provide such a rolling bearing enabling to prevent the early exfoliation in the rolling surface of the outer ring as the stationary ring and to largely lengthen the bearing life.

The object can be achieved by a rolling bearing, according to the present invention, comprising:

a stationary ring;

a rotary ring; and a plurality of rolling elements rotatably interposed between the stationary and rotary rings, at least the stationary ring is made of an iron-steel material containing alloying components of 0.40% to 1.20% by weight of carbon (C);

0.7% to 2.0% by weight of at least one of silicon (Si) and aluminum (Al);

0.2% to 2.0% by weight of manganese (Mn);

0.1% to 3.0% by weight of nickel (Ni) and 3.0% to 9.0% by weight of chromium (Cr), where Cr-equivalent amount defined by following formula (1) is 9.0 wt % to 17.0 wt %, Cr-equivalent amount (%)=[Cr]+2[Si]+1.5[Mo]+5[V]+5.5[Al]+1.75[Nb]+1.5[Ti]     (1)

in the formula, [Cr], [Si], [Mo], [V], [Al], [Nb] and [Ti] show containing percent (wt %) of Cr, Si, Mo, V, Al, Nb and Ti in the iron-steel material, and wherein the at least the stationary ring has a rolling surface which is subjected to quenching and tempering and has a hardness of HRC 57 or higher.

In addition to this, the above object can also be achieved by a rolling bearing, according to the present invention, having at least the stationary ring (a bearing ring of an inner ring and an outer ring, which will be is at a stationary side when using) satisfying the following ① to ④;

① being fabricated with an iron-steel material containing alloying components of carbon (C) 0.40 wt % to 1.20 wt %, silicon (Si) and/or aluminum (Al) 0.7 wt % to 2.0 wt %, manganese (Mn) 0.2 wt % to 2.0 wt %, nickel (Ni) 0.1 wt % to 3.0 wt % and chromium (Cr) 3.0 wt % to 9.0 wt %, where Cr-equivalent amount shown in the following (1) formula is 9.0 wt % to 17.0 wt %, and then being subjected to quenching and tempering.

Cr-equivalent amount (%)=[Cr]+2[Si]+1.5[Mo]+5[V]+5.5[Al]+1.75[Nb]+1.5[Ti]     (1)

(in the formula, [Cr], [Si], [Mo], [V], [Al], [Nb] and [Ti] show containing percent (wt %) of Cr, Si, Mo, V, Al, Nb and Ti in the iron-steel material), ② the hardness of the rolling surface is HRC 57 or higher (Rockwell hardness in the case of Scale C), ③ fine carbides of diameter being 50 nm to 500 nm are dispersively precipitated in the rolling surface, and ④ the maximum diameter of carbides existing in the rolling surface is less than 10 μm (herein, the maximum diameter being less than 10 μm means that it does not reach 10 μm).

Inventors found that large carbides having diameter of more than 10 μm easily adsorbed hydrogen, and in case large carbides existed in the rolling surface, hydrogen was easily taken in a depth direction of the baring surface, and further found that hydrogen occurring together with dissolution was trapped by fine carbides having diameter of 50 to 500 nm (MC, $M_2C$, $M_3C$, $M_7C_3$, $M_{23}C_6$).

Therefore, in the rolling bearing of the invention, the maximum diameter of carbides existing at least in the bearing face of the stationary ring is determined to be less than 10 μm, and fine carbides having diameters between 50 nm and 500 nm are dispersively precipitated in the rolling surface. Thereby, even if hydrogen exists within the bearing, it is trapped by fine carbides and is prevented from invasion until a place generating a maximum shearing stress. As a result, with respect to at least the stationary ring easily causing the exfoliation, a steel of the bearing ring is avoided from being embrittled by hydrogen.

In carbides existing in the bearing face, there are three kinds of ① fine carbides such as Mo, V, Ti dispersively precipitated by a normalizing process after a solution treatment of a blank material (ingot), ② ultra fine carbides secondarily precipitated in a tempering process following quenching after forming them in the bearing ring and more fine than ①, and ③ eutectic carbides larger than ① and ②.

A study was made on the mechanism in change of the white structure, and the following was found. Fine cracks appear by hydrogen atom trapped in a defect of the material (in particular, inclusions or grain boundary in steel), and since the fine cracks develop brittle parts within the material owing to action of the shearing stress accompanied with the rolling contact, strain locally occurs at front ends of cracks. Carbides in the matrix diffuse and cohere by the strain, resulting in accelerating the matrix fatigue, so that the white structure appears.

Therefore, in the rolling bearing of the invention, the iron-steel material having the composition strengthening the matrix is used for at least stationary ring, and the fine carbide is diffused and precipitated in the steel until a predetermined depth of the bearing face, thereby to heighten a shearing type spreading resistance of fatigue cracking for restraining development of the fine cracks. Thus, the local plastic strain occurring at the front end of the crack is reduced, thereby avoiding the occurrence of change in the white structure caused by this strain.

Depending on the rolling bearing of the invention, even if it is used at high vibration and high load under the conditions where the water easily enters therein and the grease is decomposed to issue hydrogen, the bearing face of the stationary ring is prevented from the early exfoliation, and the life is lengthened.

In the invention, by using the ① iron-steel material, the fine carbides having diameter of 50 to 500 nm (MC, $M_2C$, $M_3C$, $M_7C_3$, $M_{23}C_6$) are dispersively precipitated in the thermally treated steel (quenching and tempering). In addition, large carbides of diameter being 10 μm (eutectic carbides) are least generated, and the surface hardness after quenching and tempering can be HRC 57 or higher.

By determining the Cr-equivalent amount shown in the formula (1) to be 9.0 to 17.0 wt %, the forming condition of carbide is made good (the average diameter is 50 nm to 500 nm, and the maximum diameter is less than 10 μm), and the forming condition of inclusions other than carbide falls in an allowable range (the range where no large inclusion is formed) Herein the average diameter is defined by (maximum diameter+minimum diameter)/2 (nm)

The iron-steel material to be used in the rolling bearing of the invention contains, in addition to the alloying components of the above ①, at least one kind selected from molybdenum (Mo): 3.0 wt % or lower, vanadium (V): 2.0 wt % or lower, niobium (Nb): 1.0 wt % or lower, and titanium (Ti), where Cr-equivalent amount shown in the formula (1) is 10.0 wt % to 15.0 wt %, and the maximum diameter of carbide existing in the bearing face is preferably less than 5 μm. Upper limit values of molybdenum, vanadium, niobium and titanium are set in ranges causing no obstacles in view of workability or cost as later mentioned. The lower limit values thereof are minimum containing rates of substantially bringing about later mentioned effects.

In the inventive rolling bearing, a critical significance for limiting numerical value as to the containing rate of each element is as follows.

C: 0.40 to 1.20 wt %

C is an element for imparting the hardness to steel by making solid in the matrix, and combining carbide formers such as Cr, Mo and V to form carbides. If the C containing amount is less than 0.40 wt %, the carbon amount to be made solid in the matrix is short, and HRC of 57 or higher (the hardness demanded to the rolling bearing) might not be secured after quenching and tempering.

If C exceeds 1.20 wt %, giant carbides (Cr carbide) are easily generated during steel making, and the fatigue life or the shock resistance are probably decreased. Further, if the carbon amount is too much and Cr carbide is much generated, the Cr density in the matrix is decreased, and an enough corrosion resistance by Cr is not probably available.

Si: 0.7 to 2.0 wt %

Si is an element acting as a deoxidizer during steel making, decreasing oxide-group inclusions working as concentrating source of stress, lessening to cause change in the white structure, heightening the quenching and tempering properties, strengthening martensite of the matrix, and increasing the crack developing resistance. If the Si containing amount is less than 0.7 wt %, these effects cannot be enough obtained. If exceeding 2.0 wt %, machinability and cold working property are remarkably decreased.

Al: 0.7 to 2.0 wt %

Al is, as Si, an element for increasing the quenching and tempering properties. It is dispersively precipitated as fine nitride (AlN) in steel so as to prevent crystal grains from becoming coarse. If the Al containing amount is less than 0.7 wt %, these effects cannot be enough obtained. If exceeding 2.0 wt %, non-metallic inclusion ($Al_2O_3$) is much formed to reduce the life of the bearing.

Mn: 0.2 to 2.0 wt %

Mn is an element acting as a deoxidizer during steel making similarly to Si and increasing the quenching property. If the Mn containing amount is less than 0.20 wt %, these effects are insufficient. If exceeding 2.0 wt %, the forging property and machinability are decreased, and Mn combines with sulfur (S) or phosphors (P) to easily generate inclusions lowering the corrosion resistances.

Ni: 0.1 to 3.0 wt %

Ni is a strong element for stabilizing austenite, suppressing formation of δ ferrite, increasing toughness, and further heightening the corrosion resistance and acid proof. Similarly to Si, Ni works to heighten the crack developing resistance. If being less than 0.1 wt %, these effects cannot be brought about.

If the containing amount of Ni is too much, not only a cost is high, but also residual austenite is much generated, so that a sufficient hardness cannot be provided. So, the upper limit of the Ni content is set to be 3.0 wt %.

A preferable Ni content is 0.5 to 3.0 wt %.

Cr: 3.0 to 9.0 wt %

Cr is an element for imparting the corrosion resistance to steel, and with the Cr content of being more than 3.0 wt %, it is possible to form a chrome oxide film (passive film) of an enough thickness in the surface layer of the bearing ring where the fine carbide is dispersively precipitated.

If Cr is more than 9.0 wt %, δ ferrite is generated to make the iron-steel material brittle, remarkably decrease the toughness and the workability and easily form giant carbide (eutectic carbide of diameter being 10 μm or more).

The Cr containing rate is preferably 5.0 wt % to 8.0 wt %.

Mo: 3.0 wt % or Lower

Mo works to considerably heighten the quenching property and the temper softening resistance, and combines with C to form fine carbide of diameter being 500 nm or lower. By the fine carbide, hydrogen is trapped to make the change in the white structure difficult to change. Further, it also improves a pitting corrosion resistance.

On the other hand, if Mo is exceedingly added, since the toughness and the workability are decreased, the upper limit is set to be 3.0 wt %.

If the Mo content is 1.0 wt % or higher, $Mo_2C$ is desirably precipitated.

V: 2.0 wt % or Lower

V is an element for forming carbide and nitride, and suppressing Cr carbide and Cr nitride. If tempering at 400 to 600° C., V generates a secondary precipitation to increase hardness and has an effect heightening strength. If the V content exceeds 2.0 wt %, there arises a problem of lowering the workability and increasing material cost.

Nb: 1.0 wt % or Lower

Nb is dispersively precipitated as fine carbide and nitride in steel to prevent crystal grains from coarsening when quenching. If the Nb content is more than 1.0 wt %, since these effects are saturated, not only the material cost wastefully increases, but also the workability goes down.

Ti: 1.0 wt % or Lower

Ti is dispersively precipitated as fine carbide and nitride in steel to prevent austenite crystal grains from coarsening when quenching. If the Ti content is more than 1.0 wt %, the workability decrease and inclusions shortening the rolling life (TiN or TiS) increase.

Other Elements

Nitrogen (N) similarly to C strengthens martensite and improves the pitting corrosion resistance. When the Cr content exceeds 5.0 wt %, if N is added 0.05 wt % or higher, coarse primary eutectic carbide is suppressed from formation.

In general, Cr, Mn, Mo and V are elements for heightening solubility of N, but since the N-solubility in steel is small in an ordinary steel making process at the atmospheric pressure, it is difficult to contain N more than 0.2 wt % in the composition of the iron-steel material of the invention. Although being in the composition of the iron-steel material of the invention, if the steel making process is carried out under the high pressure nitrogen atmosphere, it is possible to contain N more than 0.2 wt %. But since a production facility under the high pressure nitrogen atmosphere is requisite and it invites high cost, the N content is preferably 0.2 wt % or lower.

Oxygen (O) restrains the formation of oxide based inclusions causing to reduce the rolling life, and the content is preferable in 10 ppm or lower.

Sulfur (S) and phosphorus (P) generate, as mentioned above, inclusions causing to decrease the corrosion resistance by combining with Mn, and 0.02 wt % or lower is preferable for controlling these inclusions.

BRIEF DESCRIPTION OF THE DRAWINGS

FIG. 2 is a view showing the test piece used to the tests for examining the spread of fatigue cracking, in which

DETAILED DESCRIPTION OF THE PREFERRED EMBODIMENTS

Further reference will be made to the mode for carrying out the invention by way of practical Examples and Comparative Examples.

Figure 1:
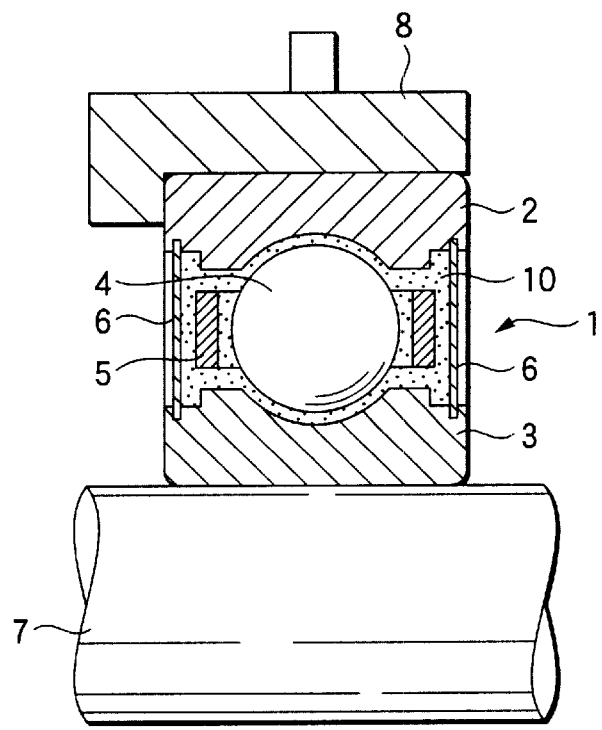
FIG. 1 is a cross sectional view showing the rolling bearing corresponding to one exemplified embodiment.

FIG. 1 is a cross sectional view showing a rolling bearing corresponding to one embodiment of the invention.

This rolling bearing 1 is a deep groove ball bearing of JIS bearing No.6303, and an outer ring 2 is a stationary ring secured to a housing 8, while an inner ring 3 is a rotary ring mounted outside on a shaft 7. Between the outer ring 2 and the inner ring 3 there are disposed many rolling elements held by a holder 5, and sealing members 6, 6 are furnished between the outer ring 2 and the inner ring 3 at both sides of the holder 5.

A space surrounded by the sealing members 6, 6 is contained as a grease with GREASE E (the same as E Grease contained in the bearing for alternator described at the 1st paragraph to the 14th paragraph of "SAE Technical Paper: SAE950944 (taking place Feb. 27 to Mar. 2, 1995)").

In the rolling bearing 1, the inner ring 3 rotates together with rotation of the shaft 7, and vibration-load by this rotation act on a loading zone of the outer ring 2 via the inner ring 3 and the rolling elements 4 from the shaft 7

Herein, the outer ring 2 and the outer ring 3 were formed in predetermined shapes with the iron-steel material of the composition shown in Table 1, followed by an ordinary thermal treatments (Comparative Example 1: quenching at 860° C. and tempering at 150° C.; Other than Comparative Example 1: hardening by quenching and tempering at 150 to 500° C.) where the quenching temperature was at an austenization temperature range determined by the amounts of alloying elements. Thereby, the amount of the residual austenite was 0 to 15 vol %. The surface roughness of the inner ring 3 and the inner ring 2 was 0.01 to 0.04 μm at Ra.

With respect to each of the samples, the bearing face of the outer ring 2 was observed 10 times by 1 μm² through TEM (a transmission type electron microscope), and with respect to carbides of 10 μm² in total existing in the bearing face, a maximum and a minimum diameters were measured to calculate an average value. When the carbide of 1 μm or more could not observed by TEM, the maximum value of the carbide of 10 μm² in total in the bearing face was investigated as a maximum diameter by SEM (a scanning type electron microscope). With respect to each sample, the surface hardness (HRC) of the bearing face of the outer ring 2 was measured, and is shown in Table 2.

The used steels contain as impurities phosphorus (P), sulfur (S) and oxygen (O) other than elements shown in Table 1, but P and S were 0.02 wt % or lower and O was 10 ppm or lower.

In both of Examples and Comparative Examples, the rolling elements 4 were formed with the same high carbon chromium bearing steel—2 category (SUJ2), followed by quenching at 860° C., oil quenching and tempering 150° C. Thereby, the amount of the residual austenite was 3 to 10 vol % and the surface hardness was HRC63. The surface roughness of the rolling elements 4 was 0.003 to 0.010 μm by Ra.

To the thus produced rolling bearings (Examples 1 to 7 and Comparative Examples 1 to 7) distinguishing the inner rings 3 and the outer rings 2 only, the following rolling fatigue life tests were practiced.

A testing machine was the life testing apparatus for the bearings disclosed in Japanese Patent Unexamined Publication No. Hei. 9-89724, performing the rapidly adjustable-speed tests which switched rotation number between 9000 rpm and 18000 rpm per each predetermined time (for example, 9 seconds). The loading condition was P (Load)/C (Load-Rating Load)=0.10, and the testing temperature was 80° C. constant. As the grease 10, the E grease was mixed with water 2 wt %.

Under these conditions, as the calculated life is 1350 hours, the testing was stopped at 1500 hours. In the tests, test pieces of Examples 1 to 10 and Comparative Examples 1 to 6 were 10 pieces respectively, and the time until delamination occurred was measured. L10 lives were demanded from results of 10 test pieces. These results are also shown in Table 2. The condition of the delamination (number of test pieces having delamination) is also shown in Table 2.

The underlined numerical values in Tables 1 and 2 show those outside of the numerically defining range of the invention. In case no delamination occurred until stopping the tests as to all the 10 test pieces, $L_{10}$ life was 1500 hours.

TABLE 1A

| | | Steel Compositions (Weight %) | | | | | | |
|---|---|---|---|---|---|---|---|---|
| | | C | Si | Al | Mn | Cr | Ni | Remarks |
| Ex. | 1 | 0.40 | 2.0 | — | 0.4 | 9.0 | 3.0 | |
| | 2 | 0.55 | 1.2 | — | 0.4 | 8.5 | 0.50 | |
| | 3 | 0.60 | 0.8 | — | 0.4 | 7.0 | 2.0 | |
| | 4 | 0.60 | 0.7 | — | 0.5 | 6.5 | 0.4 | |
| | 5 | 0.85 | 0.7 | — | 0.2 | 6.0 | 0.70 | |
| | 6 | 0.70 | 1.0 | — | 1.0 | 5.0 | 1.0 | |
| | 7 | 0.70 | 0.8 | — | 0.3 | 3.0 | 0.30 | |
| | 8 | 1.20 | 1.2 | — | 2.0 | 3.0 | 0.10 | |
| | 9 | 0.50 | 0.7 | — | 0.4 | 8.0 | 0.10 | |
| | 10 | 0.60 | — | 0.7 | 0.5 | 6.5 | 0.10 | |
| Com. | 1 | 1.05 | 0.3 | — | 0.3 | 1.5 | 0.05 | SUJ2 |
| | 2 | 1.05 | 1.8 | — | 0.8 | 1.6 | 0.30 | |
| | 3 | 0.85 | 0.2 | — | 0.2 | 2.1 | 0.05 | |
| | 4 | 0.85 | 0.6 | — | 1.0 | 4.5 | 0.30 | |
| | 5 | 0.35 | 0.9 | — | 0.3 | 13.5 | 0.30 | SUS420J2 |
| | 6 | 1.05 | 0.3 | — | 0.2 | 17.0 | 0.30 | SUS440C |

Ex.: Examples
Com.: Comparative Examples

TABLE 1B

| | | Steel Compositions (Weight %) | | | | | |
|---|---|---|---|---|---|---|---|
| | | Mo | V | Nb | Ti | Cr-Eq. | Remarks |
| Ex. | 1 | — | 0.5 | — | — | 15.5 | |
| | 2 | — | — | 1.0 | — | 12.7 | |
| | 3 | — | — | — | 1.0 | 10.1 | |
| | 4 | 0.5 | — | — | 0.2 | 9.0 | |
| | 5 | 1.0 | 1.0 | 0.5 | — | 14.8 | |
| | 6 | — | 2.0 | — | — | 17.0 | |
| | 7 | 3.0 | — | — | — | 9.1 | |
| | 8 | 1.0 | 0.5 | — | — | 9.4 | |
| | 9 | — | — | — | — | 9.4 | |
| | 10 | 1.0 | — | — | — | 11.9 | |
| Comp. | 1 | — | — | — | — | 2.1 | SUJ2 |
| | 2 | 2.0 | 1.0 | — | — | 13.2 | |
| | 3 | 2.0 | 0.5 | — | — | 8.0 | |
| | 4 | — | — | — | — | 5.7 | |
| | 5 | — | — | — | — | 15.3 | SUS420J2 |
| | 6 | — | — | — | — | 17.6 | SUS440C |

Ex.: Examples
Com.: Comparative Examples
Cr-Eq.: Cr-Equivalent (%)

TABLE 2

|   |    | A (° C.) | B HRC | C (μm) | D (nm) | Test results of bearings | | Spread resistance of fatigue cracking ΔKIIth (MPa√m) |
|---|----|----------|-------|--------|--------|--------------------------|--|------|
|   |    |          |       |        |        | L10 life (hr) | Peeled conditions | |
| Ex. | 1 | 150 | 63 | 3.0 | 475 | 1500 | No peeling | 22.0 |
|   | 2 | 450 | 64 | 1.0 | 100 | 1500 | " | 29.3 |
|   | 3 | 300 | 57 | 1.0 | 210 | 1500 | " | 30.4 |
|   | 4 | 150 | 61 | 2.0 | 50 | 1480 | 3/10 Peeling in outer ring | 26.4 |
|   | 5 | 500 | 64 | 1.0 | 300 | 1500 | No peeling | 31.5 |
|   | 6 | 400 | 62 | 1.0 | 500 | 1500 | " | 21.3 |
|   | 7 | 150 | 60 | 1.0 | 95 | 1403 | 2/10 Peeling in outer ring | 25.2 |
|   | 8 | 150 | 62 | 1.0 | 71 | 1425 | 2/10 Peeling in outer ring | 25.7 |
|   | 9 | 150 | 58 | 2.0 | 63 | 1400 | 3/10 Peeling in outer ring | 21.0 |
|   | 10 | 150 | 61 | 1.0 | 150 | 1500 | No peeling | 27.3 |
| Com. | 1 | 150 | 62 | 2.0 | 1080 | 139 | 10/10 Peeling in outer ring | 14.1 |
|   | 2 | 300 | 59 | 1.5 | 487 | 345 | 10/10 Peeling in outer ring | 19.1 |
|   | 3 | 400 | 61 | 4.5 | 447 | 736 | 10/10 Peeling in outer ring | 16.3 |
|   | 4 | 150 | 63 | 5.0 | 31 | 294 | 10/10 Peeling in outer ring | 15.9 |
|   | 5 | 150 | 54 | 10.0 | 450 | 203 | 10/10 Peeling in outer ring | 19.6 |
|   | 6 | 450 | 62 | ≧15.0 | 2350 | 198 | 10/10 Peeling in outer ring | 12.9 |

Figure 2A:
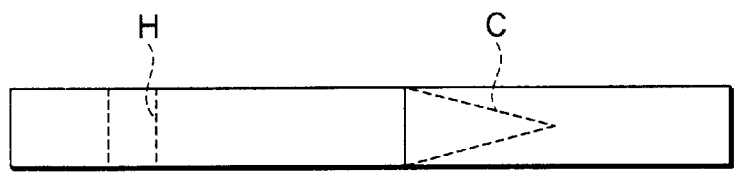
FIG. 2A is a plan view when the test piece is laid such that the plane face crosses with a horizontal face.
Figure 2B:
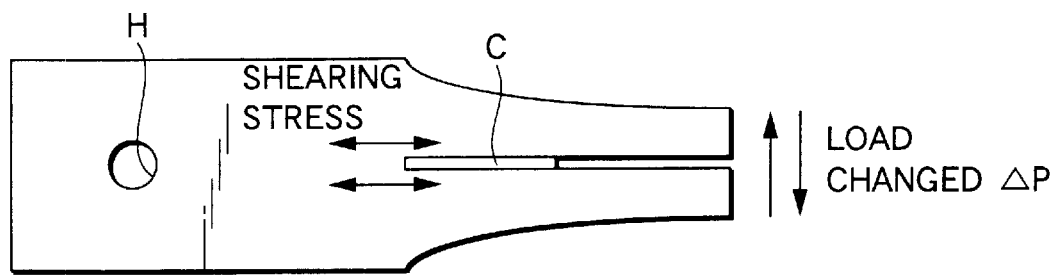
FIG. 2B is a front view at that time.

Ex.: Examples
Com.: Comparative Examples
A: Tempering temperature
B: Surface hardness
C: Maximum diameter of carbide
D: Average diameter carbide Tests for investigating spread of fatigue cracking of the inner and outer rings of Examples 1 to 10 and Comparative Examples 1 to 6 were carried out as follows with the test pieces as shown in FIG. 2.

The test were based on the testing method described in "Explication by destructive dynamics of micro and macro tribology problem, Theme No.07305050, Subsidy for chemical research expense in 1995 to 1996Research for base plate (A) (1)), Report of studied results, March 1997, pp. 53 to 61". The test pieces shaped as in FIG. 2 were formed with the iron-steel materials of the compositions shown in Table 1, and the respective test pieces were subjected to the thermal treatment. As seen in FIG. 2, the test piece is formed with an attaching hole H for the testing machine and a crack spread measuring portion C.

With the thermally treated test pieces, as values showing spread resistance of fatigue cracking of Mode II (Shearing type), lower limit values of fatigue crack developing (scope of enlarging coefficient of stress of the lower limit), $\Delta K_{IIth}$, were measured. The larger this value, the crack spread is difficult at an initial step of service.

The testing machine was an electrohydraulic servo type tension fatigue tester. The testing conditions were testing temperature=room temperature, load variation width $\Delta P$=1500 kgf, frequency number f=6 Hz, and symmetric sine wave (stress ratio R=−1) Cracking lengths were measured by AC potentiometer.

$\Delta K_{IIth}$ of the respective samples is shown in Table 2.

As seen from these tested results, in the rolling bearings of Examples 1 to 10, the compositions of the iron-steel materials forming the outer rings and the inner rings satisfy the ranges of the invention (C, Si/Al, Mn, Cr, Ni), the Cr-equivalent amounts forming the outer rings and the inner rings also satisfy the ranges of the invention (9.0 to 17.0 wt %), the conditions of carbide meet the inventive ranges (average diameter: 50 to 500 nm, maximum diameter: less than 10 μm), and the surface hardness falls within the inventive range (HRC57 or higher), and accordingly the lives under the high vibration and high load are considerably lengthened in comparison with the bearings of Comparative Examples 1 to 6 which miss even one of these conditions.

In particularly, in Examples 1 to 3, 5, 6 and 10, the compositions of the iron-steel materials forming the outer rings and the inner rings satisfy the preferable ranges of the invention (C, Si/Al, Mn, Cr, Ni, Mo/V/Nb/Ti), the Cr-equivalent amounts forming the outer rings and the inner rings are 10.0 to 17.0 wt %, and the average diameters of carbide are 100 to 500 nm, and the lives under the high vibration and high load are elongated in comparison with Examples 4, 7 to 9 any of which are outside from these preferable ranges.

With respect to the spread resistance of fatigue cracking, Examples 1 to 10 satisfy all the inventive ranges in the compositions and the Cr-equivalent amount of the iron-steel materials, the conditions of carbide, and the surface hardness, and so, the values are larger than those of Comparative Examples. If satisfying the inventive ranges, it is seen that the cracking spread is difficult at the initial step of service. Incidentally, since in Comparative Example 6, the eutectic carbide of the maximum diameter being 15 μm or more is created, the average diameter of carbide is very large as 2350 nm.

Especially in Examples 2, 3, 5 and 10, the average diameters of carbide are 100 to 300 nm and the Cr-equivalent amount is 10 to 15 wt %, and the spread resistance of fatigue cracking is larger than those of Examples 1, 4 and 6 to 9 being outside of these ranges. Accordingly, for heightening the spread resistance of fatigue cracking, it is preferable that the average diameters of carbides dispersively precipitating in the bearing face are set to be 100 to 300 nm, and the Cr-equivalent amount of the using iron-steel material is 10 wt % to 15 wt %.

Namely, it is preferable that spread resistance of fatigue cracking, $\Delta KIIth(MPa\sqrt{m})$, has a lower limit of 21.0 or more, because the $L_{10}$ Life can be improved, as shown in Table 2.

By the way, in the present embodiment, not only the outer ring being the stationary ring but also the inner ring being the rotary ring satisfy the above ① to ④, but if the only stationary ring easily much caused with delamination satisfies the above ① to ④ and the ordinary SUJ2 steel is employed to the rotary ring and the rolling elements, the cost-up may be checked as making the lives longer than conventional rings.

Further, the embodiment performed the tests with the ball bearings, but the rolling bearing of the invention is not limited to the ball bearing. For example, similar effects may be brought about to roller bearings (taper roller bearing or needle roller bearing) in which it is difficult to heighten the precision of the roughness in the bearing face and to form oil films even with a lubricant.

As discussed above, according to the invention, it is possible to prevent the early exfoliation in the bearing face of the outer ring being the stationary ring in the rolling bearing to be served at the high vibration and high load under the condition where the water is mixed with the lubricant.

What is claimed is:

1. A rolling bearing comprising:
    a stationary ring;
    a rotary ring; and
    a plurality of rolling elements rotatably interposed between said stationary and rotary rings,
    at least said stationary ring is made of an iron-steel material containing alloying components of:
    0.40% to 1.20% by weight of carbon (C);
    0.7% to 2.0% by weight of at least one of silicon (Si) and aluminum (Al);
    0.2% to 2.0% by weight of manganese (Mn);
    0.1% to 3.0% by weight of nickel (Ni) and
    3.0% to 9.0% by weight of chromium (Cr),
    where Cr-equivalent amount defined by following formula (1) is 9.0 wt % to 17.0 wt %, Cr-equivalent amount (%)=[Cr]+2[Si]+1.5[Mo]+5[V]+5.5[Al]+1.75[Nb]+1.5[Ti]  (1)

in the formula, [Cr], [Si], [Mo], [V], [Al], [Nb] and [Ti] show containing percent (wt %) of Cr, Si, Molybdenum (Mo), Vanadium (V), Al, Niobium (Nb) and Titanium (Ti) in the iron-steel material, and
    wherein said at least said stationary ring has a rolling surface which is subjected to quenching and tempering and has hardness of HRC 57 or higher,
    wherein at least said stationary ring further comprises:
        at least one of V, Nb and Ti, while satisfying a condition that V≦2.0 wt %, Nb≦1.0 wt %, and Ti≦1.0 wt %, and
    wherein a maximum diameter of carbide existing in the rolling surface of at least said stationary ring is less than 10 μm,
    wherein average diameter of fine carbide existing in the rolling surface of at least said stationary ring is 71 to 475 nm, and
    wherein the average diameter is defined by (maximum diameter+minimum diameter)/2 (nm).

2. The rolling bearing as set forth in claim 1, further containing:
    10 ppm or less of O;
    0.02% or less by weight of S; and
    0.02% or less by weight of P.

3. The rolling bearing as set forth in claim 1, wherein at least said stationary ring further contains:
    0.05% to 0.2% by weight of nitrogen (N).

4. The rolling bearing as set forth in claim 2, wherein at least said stationary ring further contains:
    0.05% to 0.2% by weight of nitrogen (N).

5. The rolling bearing as set forth in claim 1, wherein maximum diameter of carbide existing in the rolling surface of at least said stationary ring is less than 5 μm, and said Cr-equivalent amount defined by the formula (1) is 10.0 wt % to 15.0 wt %.

6. The rolling bearing as set forth in claim 2, wherein maximum diameter of carbide existing in the rolling surface of at least said stationary ring is less than 5 μm, and said Cr-equivalent amount defined by the formula (1) is 10.0 wt % to 15.0 wt %.

7. The rolling bearing as set forth in claim 3, wherein maximum diameter of carbide existing in the rolling surface of at least said stationary ring is less than 5 μm, and said Cr-equivalent amount defined by the formula (1) is 10.0 wt % to 15.0 wt %.

8. The rolling bearing as set forth in claim 4, wherein maximum diameter of carbide existing in the rolling surface of at least said stationary ring is less than 5 μm, and said Cr-equivalent amount defined by the formula (1) is 10.0 wt % to 15.0 wt %.

9. A rolling bearing comprising:
    a stationary ring;
    a rotary ring; and
    a plurality of rolling elements rotatably interposed between said stationary and rotary rings,
    at least said stationary ring is made of an iron-steel material comprising alloying components of:
    0.40% to 1.20% by weight of carbon (C);
    0.7% to 2.0% by weight of at least one of silicon (Si) and aluminum (Al);
    0.2% to 2.0% by weight of manganese (Mn);
    0.1% to 3.0% by weight of nickel (Ni) and
    3.0% to 9.0% by weight of chromium (Cr),
    where Cr-equivalent amount defined by following formula (1) is 9.0 wt % to 17.0 wt %, Cr-equivalent amount (%)=[Cr]+2[Si]+1.5[Mo]+5[V]+5.5[Al]+1.75[Nb]+1.5[Ti]  (1)

in the formula, [Cr], [Si], [Mo], [V], [Al], [Nb] and [Ti] show containing percent (wt %) of Cr, Si, Molybdenum (Mo), Vanadium (V), Al, Niobium (Nb) and Titanium (Ti) in the iron-steel material, and
    wherein at least said stationary ring further comprises:
        at least one of V, Nb and Ti, while satisfying a condition that V≦2.0 wt % Nb≦1.0 wt %, and Ti≦1.0 wt %, and
    wherein average diameter of fine carbide existing in the rolling surface of at least said stationary ring is 71 to 475 nm, and wherein the average diameter is defined by (maximum diameter+minimum diameter/2 (nm).

10. The rolling bearing as set forth in claim 10, further containing:

10 ppm or less of O;

0.02% or less by weight of S; and 0.02% or less by weight of P.

11. The rolling bearing as set forth in claim 9, wherein at least said stationary ring further comprises:

0.05% to 0.2% by weight of nitrogen (N).

12. The rolling bearing as set forth in any one of claims 1 to 8, 9, and 11, wherein the rolling bearing is used for auxiliary machines of an automobile engines.

* * * * *